United States Patent
Hu et al.

(10) Patent No.: US 9,696,006 B2
(45) Date of Patent: Jul. 4, 2017

(54) LED MODULE AND LENS MOUNTED THEREON

(71) Applicant: HON HAI PRECISION INDUSTRY CO., LTD., New Taipei (TW)

(72) Inventors: Chau-Jin Hu, New Taipei (TW); Feng-Yuen Dai, New Taipei (TW); Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 85 days.

(21) Appl. No.: 14/700,368

(22) Filed: Apr. 30, 2015

(65) Prior Publication Data
US 2016/0053964 A1 Feb. 25, 2016

(30) Foreign Application Priority Data
Aug. 19, 2014 (TW) .................................. 103128380

(51) Int. Cl.
| F21V 5/04 | (2006.01) |
| F21V 7/00 | (2006.01) |
| G02B 19/00 | (2006.01) |
| F21Y 115/10 | (2016.01) |

(52) U.S. Cl.
CPC ............ F21V 5/045 (2013.01); F21V 7/0091 (2013.01); G02B 19/0028 (2013.01); G02B 19/0061 (2013.01); G02B 19/0071 (2013.01); *F21Y 2115/10* (2016.08)

(58) Field of Classification Search
CPC . F21V 5/00; F21V 5/002; F21V 5/003; F21V 5/004; F21V 5/005; F21V 5/006; F21V 5/007; F21V 5/008; F21V 5/02; F21V 5/04; F21V 5/041; F21V 5/043; F21V 5/045; F21V 5/046; F21V 5/048; F21V 7/0091
USPC ..................... 362/311.02, 332–338
See application file for complete search history.

(56) References Cited

U.S. PATENT DOCUMENTS

| 2,215,900 | A * | 9/1940 | Bitner ....................... F21V 5/04 359/718 |
| 7,514,722 | B2 * | 4/2009 | Kawaguchi ............... F21K 9/00 257/79 |
| 7,549,769 | B2 * | 6/2009 | Kim ......................... F21V 5/04 362/241 |
| 9,416,926 | B2 * | 8/2016 | Wilcox .............. G02B 19/0028 |
| 2010/0085763 | A1 * | 4/2010 | Aguglia ................... F21V 5/04 362/311.06 |
| 2012/0268949 | A1 * | 10/2012 | Parkyn ..................... F21V 5/04 362/327 |
| 2014/0321128 | A1 * | 10/2014 | Wu ....................... F21S 48/215 362/308 |

* cited by examiner

*Primary Examiner* — Robert May
(74) *Attorney, Agent, or Firm* — Steven Reiss

(57) ABSTRACT

A lens has a first, second and third optical region. The first, second and third optical region are arranged in sequential order. Space angle defined between each first, second and third optical region, and an optical axis of the lens are different from each other. An LED light module, which has an LED chip and the lens is also provided. The light emitted from the LED chip passes the reflecting surface and refractive surface and radiates from a top of the lens.

7 Claims, 3 Drawing Sheets

LED MODULE AND LENS MOUNTED THEREON

CROSS-REFERENCE TO RELATED APPLICATIONS

This application claims priority to Taiwan Patent Application No. 103128380 filed on Aug. 19, 2014, the contents of which are incorporated by reference herein.

FIELD

The subject matter herein generally relates to an LED module and a lens of the LED module.

BACKGROUND

Generally, a light emitting diode (LED) includes an LED chip and an encapsulating layer covering the LED chip. The LED generally generates a smooth round light field with a radiation angle of 120 degrees (i.e. ±60 degrees). However, the light emitted from the LED still has a bigger angle relatively to the optical axis. the light intensity concentrated at a center of the LED is not strong enough. The LED cannot be used in special place which needs a smaller angle and strong concentrated light, such as engraving machine, cutting tools and product display ark etc.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like.

Figure 1:
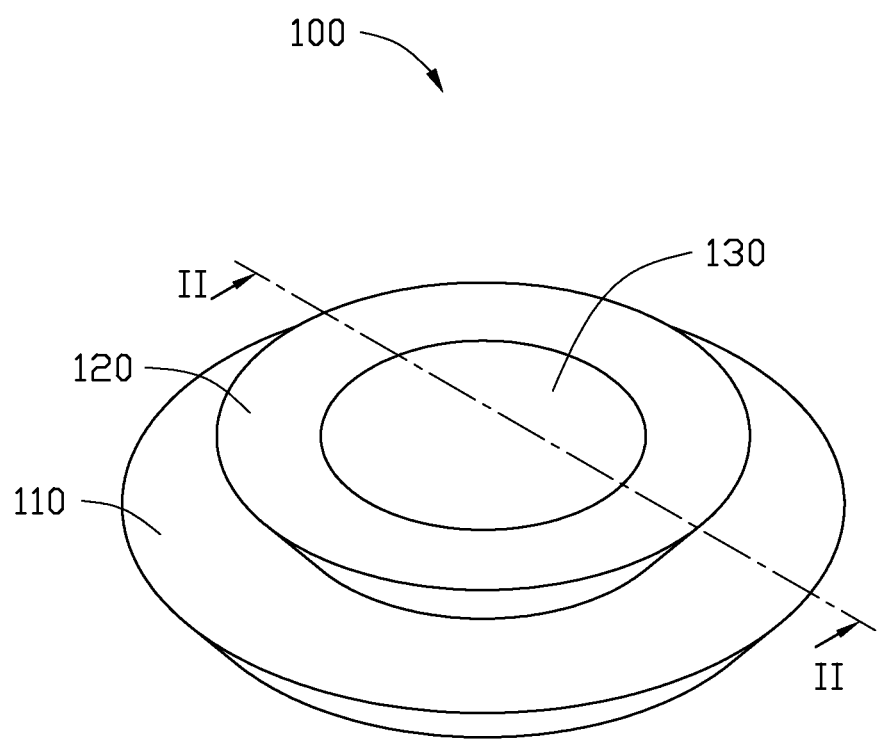
FIG. 1 is an isometric view of an LED module of the present disclosure.
Figure 2:
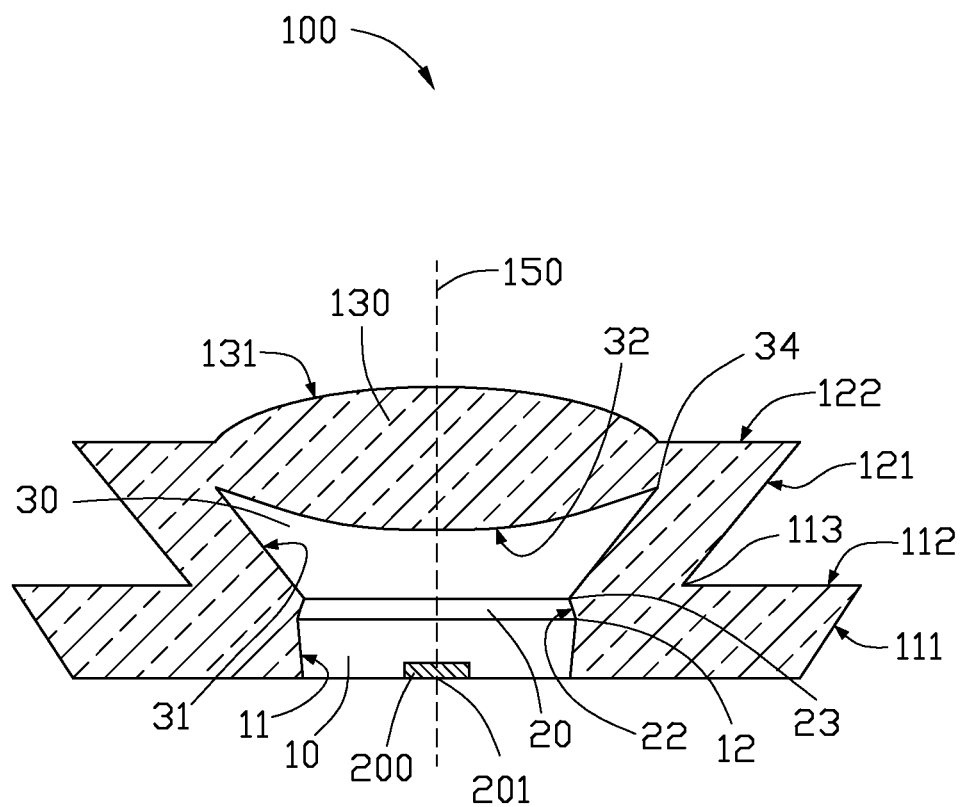
FIG. 2 is a cross sectional view of the LED module of FIG. 1, taken along II-II line thereof.

Referring to FIGS. 1-2, an LED module of the present disclosure includes an LED chip 200 and a lens 100 cooperating with the LED chip 200.

Figure 3:
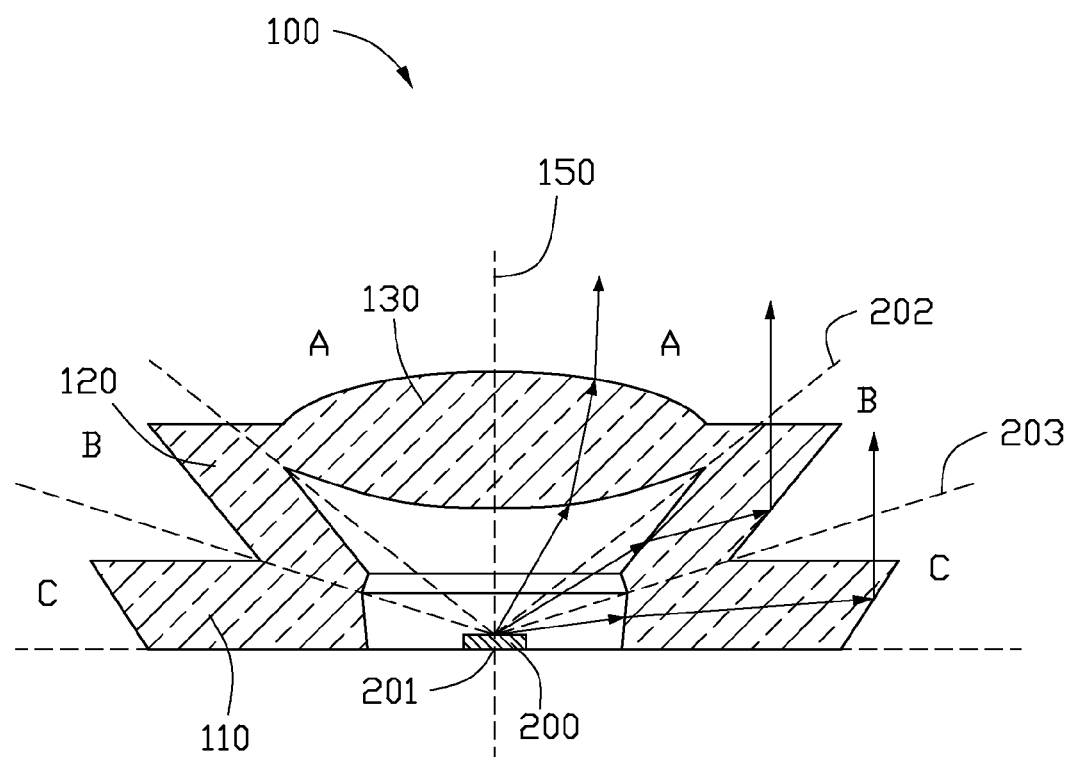
FIG. 3 is a light path diagram of the LED module.

Referring also to FIG. 3, the lens 100 includes a main portion 110, an extending portion 120 protruding from a central portion of a top end of the main portion 110, and a light concentrating portion 130 protruding from a central portion of a top end of the extending portion 120. The lens 100 also has an optical axis 150. The optical axis 150 is at a radial center of the lens 100. The main portion 110 the extending portion 120 and the concentrating portion 130 are coaxial and are rotational symmetric about the optical axis 150. A placing point 201 intersecting with the optical axis 150 and a bottom of the lens 100 is defined.

The main portion 110 has a shape of frustum. A diameter of the main portion 110 increases from bottom to top. The main portion 110 includes a first inclining face 111 and a first top face 112 connected with a top end of the first inclining face 111.

The extending portion 120 has a shape of the frustum. A diameter of the extending portion 120 increases from bottom end connecting with the main portion 110, towards top end of the extending portion 120. The diameter of the bottom end of the protruding portion 120 is equal to that of the top end of the main portion 110. The protruding portion 120 includes a second inclining face 121 and a second top face 122 connecting with a top end of the second inclining face 121. The first top face 112 and the second inclining face 121 intersect to form a circular edge shown in diametric cross section of the lens 100 to form first intersection points 113. The first intersection points 113 are symmetrical about the optical axis 150 in diametric cross section of the lens 100. The first top face 112 is parallel with the second top face 122. The diameter of the second top face 122 is smaller than that of the first top face 112.

The light concentrating portion 130 is arc-shaped and convex. The concentrating portion 130 has an outer face 131 connected with the second top face 122. The light concentrating portion 130 gathers the light emitted from the LED chip 200.

The lens 100 have a first cavity 10 and a second cavity 20, configured along the optical axis 150 and from the bottom end to the top end of the main portion 110, a third cavity 30 connects the second cavity and configures towards the extending portion 120. The first cavity 10, the second cavity 20 and the third cavity 30 are through along the optical axis 150 and are rotational symmetric about the optical axis 150.

The first cavity 10 is frusto-conical, and is bounded by a first inner face 11. A diametric cross view of the first cavity 10 has a trapezoidal-shape. The diameter of the first cavity 10 decreases from the top end connected with the second cavity 20, towards a bottom end of the main portion 110. The LED chip 200 is received in the first cavity 10, and is posited at the placing point 201.

The second cavity 20 is defined by a second inner face 22. The second inner face 22 extends from the top end of the first inner face 11. The second inner face 22 is defined on a partial sphere with a core at the placing point 201. The diameter of the bottom end of the cavity 20 is equal to that of the top end of the first cavity 10. The second inner face 22 and the first inner face 11 intersect to form a circular edge shown in diametric cross section of the lens 100 to form second intersections points 12. The second intersections points 12 are symmetrical about the optical axis 150 in the diametric cross section of the lens 100.

The third cavity 30 is defined by a third inner face 31 and a fourth inner face 32. The third inner face 31 extends upwardly from the top end of the second inner face 22, and away from the optical axis 150. The fourth inner face 32 connects with a top end of the third inner face 31, extends closely the optical axis 150 and towards the first cavity 10. The diameter of the bottom end of the third cavity 30 is equal to that of the top end of the second cavity 20. The third inner face 31 and the second inner face 22 intersect to form a circular edge shown in diametric cross section of the lens 100 to form third intersection points 23. The third intersection points 23 are symmetrical about the optical axis 150 in the diametric cross section of the lens 100. The third inner face 31 and the fourth inner face 32 intersect to form a circular edge shown in diametric cross section of the lens 100 to form fourth intersection points 34. The fourth intersection points 34 are symmetrical about the optical axis 150 in diametric cross section of the lens 100.

As shown in FIG. 3, at a side of the optical axis 150 of the diametric cross section of the lens 100, the fourth intersection points 34 and the placing point 201 cooperatively define an imaginary first line 202; the first intersection points 113, the second intersection points 12 and the placing point 201 cooperatively define a imaginary second line 203;

The lens 100 also defines a plurality of first, second and third optical regions A, B and C, arranged from the top end of the lens 100 towards the bottom end of the lens 100. The imaginary first line 202 projects around the optical axis 150 to form a first conical area. The first conical area located in the lens 100 defines the first optical region A. The imaginary second line 203 projects around the optical axis 150 to form a second conical area. The second conical area located except the first optical region A in the lens 100 defines the second optical region B. The third optical region C is defined between the second conical area and the bottom end of the lens 100. An angle defined between the optical axis 150 and a imaginary line defined between the placing point 201 and a point within the second optical region B, is larger than an angle defined between the optical axis 150 and a imaginary line defined between the placing point 201 and a point within the first optical region A. An angle defined between the optical axis 150 and a imaginary line defined between the placing point 201 and a point within the third optical region C, is larger than an angle defined between the optical axis 150 and a imaginary line defined between the placing point 201 and a point within the second optical region B.

In this disclosure, an angle defined between the optical axis 150 and the third inner face 31 is larger than an angle defined between the optical axis 150 and the first inner face 11; an angle defined between the optical axis 150 and the second inclining face 121 is larger than an angle defined between the optical axis 150 and the first inclining face 111. The outer face 131 is located opposite at the fourth inner face 32. A focus of the light concentrating portion 130 is posited at the placing point 201. The third inner face 31, the first inner face 11, the outer face 131 and the fourth inner face 32 refract properly the light emitted from the LED chip 200. The second inclining face 121 and the first inclining face 111 reflect properly the light emitted from the LED chip 200. Because the second inner face 22 is defined on a partial sphere with a core at the placing point 201, so the second inner face 22 do not change the path of the light emitted from the LED chip 200.

The light emitted from the LED chip 200 having a different radiating angle relative to the optical axis 150 respectively enters the first, second and third optical region A, B and C. Part of light enters the first optical region A, the light is refracted by the fourth inner face 32, the outer face 131 and part of the second top face 122 to exit from the top end of the lens 100. Part of light enters the second optical region B, the light is firstly refracted by the third inner face 31 or traverses the second inner face 22, and then is reflected by the second inclining face 121 to exit from the top end of the lens 100. The light enters the third optical region C, the light is refracted by the first inner face 11, and is reflected by the first inclining face 111 to exit from the top end of the lens 100. The light emitted by the LED chip 200 enters the first, second and third optical regions A, B and C. The original light path of the light is changed by the lens 100 to gather the light to exit towards the top end of the lens 100. So the light exited from the lens 100 has small angle relative to the optical axis 100 and has great intensity around the optical axis 150.

The embodiments shown and described above are only examples. Many details are often found in the art such as the other features of an LED module and lens mounted thereon. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A lens having a radial center comprising:
an optical axis at the radial center of the lens;
a placing point intersecting with the optical axis and a bottom of the lens;
a first, second and third optical region defined in sequential order;
a first imaginary line defined between the placing point and a point within the first optical region;
a second imaginary line defined between the placing point and a point within the second optical region;
a third imaginary line defined between the placing point and a point within the third optical region;
an angle defined between the optical axis and the second imaginary line is larger than an angle defined between the optical axis and the first imaginary line;
an angle defined between the optical axis and the third imaginary line is larger than an angle defined between the optical axis and the second imaginary line;
wherein the lens includes a main portion, and extending portion protruding from a central portion of a top end of the main portion, and a light concentrating portion protruding from a central portion of a top end of the extending portion, the main portion has a first inclining face and a first top face, the protruding portion has a second inclining face and a second top face, the light concentrating portion has an outer face;
wherein a first cavity and a second cavity are configured along the optical axis and from bottom end to top end of the main portion, a third cavity connects with the second cavity and is configured towards the extending portion;
wherein the first cavity includes a first inner face, the second cavity includes a second inner face, and the third cavity includes a third inner face and a fourth inner face;
wherein the first top face and the second inclining face intersect to form a circular edge shown in diametric cross section of the lens to form first intersection point, the second inner face and the first inner face intersect to form a circular edge shown in diametric cross section of the lens to form second intersections points, the third inner face and the second inner face intersect to form a circular edge shown in diametric cross section of the lens to form third intersection points, the third inner face and the fourth inner face intersect to form a circular edge shown in diametric cross section of the lens to form fourth intersection points;

wherein the fourth intersection points and the placing point cooperatively define an imaginary first line, the first intersection points, the second intersection points and the placing point cooperatively define an imaginary second line;

wherein the imaginary first line projects around the optical axis to form a first conical area, the first conical area located in the lens defines the first optical region, the imaginary second line projects around the optical axis to form a second conical area, the second conical area located except the first optical region in the lens defines the second optical region, the third optical region defines between the second conical area and the bottom end of the lens.

2. The lens of claim 1, wherein the first top face is parallel with the second top face, a diameter of the second top face is smaller than that of the first top face.

3. The lens of claim 1, wherein an angle defined between the optical axis and the second inclining face is larger than an angle defined between the optical axis and the first inclining face.

4. The lens of claim 1, wherein an angle defined between the optical axis and the third inner face is larger than an angle defined between the optical axis and the first inner face.

5. The lens of claim 1, wherein the outer face is located opposite at the fourth inner face, a focus of the light concentrating portion is posited at the placing point.

6. The lens of claim 1, wherein the third inner face, the first inner face, the outer face and the fourth inner face refract the light emitted from an LED chip, the second inclining face and the first inclining face reflect the light emitted from the LED chip.

7. The lens of claim 6, wherein the first cavity, the second cavity and the third cavity are through along the optical axis and are rotational symmetric about the optical axis.

* * * * *